United States Patent
Kajita

(10) Patent No.: US 11,054,927 B2
(45) Date of Patent: Jul. 6, 2021

(54) IN-CELL TOUCH PANEL

(71) Applicant: Panasonic Liquid Crystal Display Co., Ltd., Himeji (JP)

(72) Inventor: Daisuke Kajita, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/751,736

(22) Filed: Jan. 24, 2020

(65) Prior Publication Data
US 2020/0278766 A1 Sep. 3, 2020

(30) Foreign Application Priority Data
Feb. 28, 2019 (JP) .............................. JP2019-035856

(51) Int. Cl.
*G06F 3/041* (2006.01)
*G09G 3/36* (2006.01)
*G06F 3/044* (2006.01)

(52) U.S. Cl.
CPC ........ *G06F 3/0412* (2013.01); *G06F 3/04164* (2019.05); *G09G 3/3648* (2013.01); *G09G 3/3688* (2013.01); *G06F 3/0446* (2019.05); *G09G 2300/0452* (2013.01)

(58) Field of Classification Search
CPC ....... G02F 1/1309; G02F 2001/136263; G02F 2001/136268; G02F 2001/136272; G09G 2300/0413; G09G 2300/0452; G09G 3/2003; G09G 3/3648; G09G 3/3607; G09G 3/2074; G09G 2300/0439; G06F 3/0412; G06F 3/044; G06F 3/047; G06F 3/0445; G06F 3/0443; G06F 3/0446; H01L 27/3276; H01L 27/3223; H01L 2251/568

See application file for complete search history.

(56) References Cited

U.S. PATENT DOCUMENTS

| | | | |
|---|---|---|---|
| 2013/0241958 A1* | 9/2013 | Bae | G09G 3/3607 345/690 |
| 2015/0001540 A1* | 1/2015 | Chang | G09G 3/20 257/59 |
| 2016/0020224 A1* | 1/2016 | Kawamura | H01L 27/1248 345/213 |
| 2017/0269425 A1 | 9/2017 | Nakagawa et al. | |
| 2017/0307933 A1* | 10/2017 | Chen | G02F 1/133514 |

(Continued)

FOREIGN PATENT DOCUMENTS

JP 2017-167351 9/2017
WO 2017/213173 12/2017

*Primary Examiner* — Sanjiv D. Patel
(74) *Attorney, Agent, or Firm* — Hamre, Schumann, Mueller & Larson. P.C.

(57) ABSTRACT

An in-cell touch panel includes: transistors and pixel electrodes respectively provided in pixels; common electrodes arranged in a first direction and a second direction, each facing one or more of the pixel electrodes and provided separately from each other; gate lines extending along the first direction; data lines extending along the second direction; dummy data lines extending along the second direction, provided in a same layer as the data lines; and touch lines extending along the second direction and connected to a corresponding one of common electrodes. The data lines and the dummy data lines are alternately provided for boundaries between two pixels adjacent in the first direction.

11 Claims, 13 Drawing Sheets

(56) References Cited

U.S. PATENT DOCUMENTS

2019/0114023 A1* 4/2019 Gotoh ................ G06F 3/04184
2019/0196638 A1    6/2019 Tominaga et al.
2020/0285088 A1* 9/2020 Xu ........................ G02F 1/1368

* cited by examiner

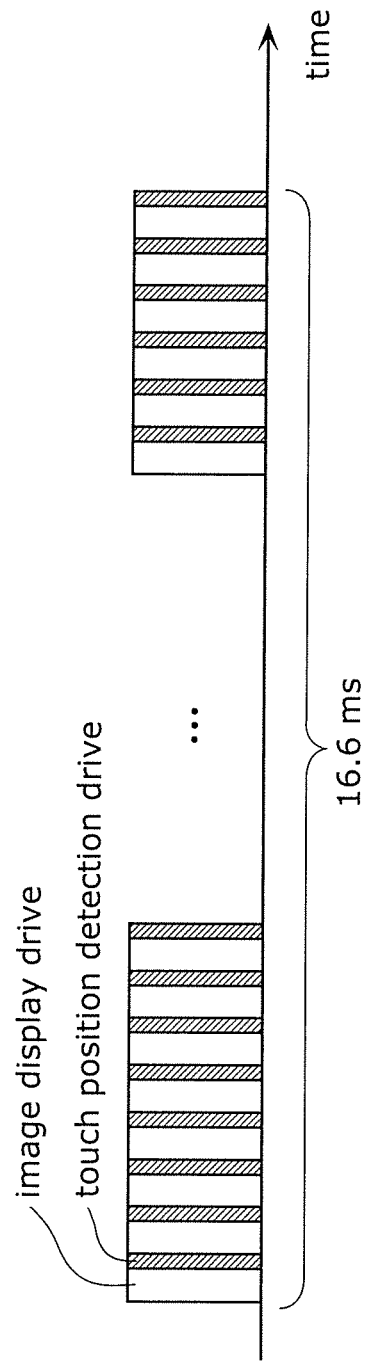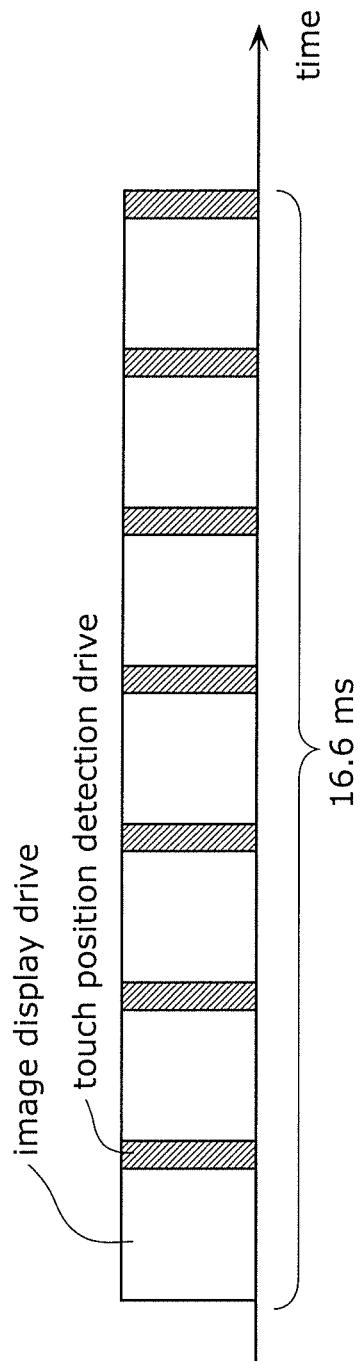

IN-CELL TOUCH PANEL

CROSS-REFERENCE TO RELATED APPLICATION

This application claims priority from Japanese application JP 02019-035856, filed on Feb. 28, 2019. This Japanese application is incorporated herein by reference.

TECHNICAL FIELD

The present disclosure relates to an in-cell touch panel.

BACKGROUND

In recent years, a liquid crystal display device having both a touch function and a display function has been developed. In a liquid crystal display device having a touch function, for example, touch sensing is performed by a capacitance method. In this case, a position touched by a user is sensed by detecting, with a touch electrode, a change in capacitance generated when a pointer such as the user's finger or pen touches or approaches a display screen.

As the touch sensing by the capacitance method, there is known a self-capacitive method that detects a change in capacitance between a touch object such as the finger or pen and a touch electrode (Rx electrode) when the touch object touches the liquid crystal display device, and a mutual capacitive method that detects a change in capacitance between two touch electrodes (Rx electrode, Tx electrode).

As a structure of a liquid crystal display device having a touch function, there are known an out-cell method in which a touch panel having the touch function is attached to the surface of the liquid crystal display panel and an in-cell method in which the liquid crystal display device itself has the touch function.

For example, International Publication No. 2017/213173 discloses an in-cell type liquid crystal display device having a touch function. The liquid crystal display device disclosed in International Publication No. 2017/213173 includes a plurality of gate lines extending in the row direction, a plurality of data lines extending in the column direction, a pixel electrode provided in each of the plurality of pixels, a plurality of common electrodes (counter electrodes) provided facing the plurality of pixel electrodes, and signal lines connected to the common electrodes as touch lines. In the liquid crystal display device disclosed in International Publication No. 2017/213173, a touch drive signal for detecting a touch position is supplied to the counter electrode, so that a touch detection signal is received via the signal line, and a change in capacitance at the position of the counter electrode is detected to sense the touch position.

SUMMARY

In the in-cell touch panel that is the in-cell type liquid crystal display device having a touch function, it is conceivable that touch lines connected to a common electrode are formed in the same direction as data lines. For example, it is conceivable that both the data line and the touch line extend in the column direction. Thereby, the data line and the touch line can be easily connected to a source driver with a touch function mounted at the end of the liquid crystal display device on the column-direction side.

In this case, it is conceivable that the touch lines and data lines extending in the column direction are arranged simply cyclically and repeatedly along the row direction.

However, when the touch lines and the data lines are cyclically and repeatedly arranged, geometric optical unevenness occurs, and the image quality deteriorates.

The present disclosure provides an in-cell touch panel that can prevent degradation in image quality even when touch lines and data lines extend in the same direction.

An in-cell touch panel according to a present disclosure has an image display region made up of a plurality of pixels arranged in a first direction and a second direction intersecting the first direction. The in-cell touch panel includes: a transistor and a pixel electrode provided in each of the plurality of pixels; a plurality of common electrodes arranged in each of the first direction and the second direction, each facing one or more of the pixel electrodes and provided separately from each other; a plurality of gate lines extending along the first direction and each supplying a gate signal to the transistor in each of the plurality of pixels; a plurality of data lines extending along the second direction and each supplying a data signal to the transistor in each of the plurality of pixels; a plurality of dummy data lines extending along the second direction, provided in a same layer as the data lines, and each supplying no data signal to the transistor in each of the plurality of pixels; and a plurality of touch lines extending along the second direction and connected to respectively corresponding common electrodes, wherein the plurality of data lines and the plurality of dummy data lines are alternately provided one by one for each boundary between two pixels adjacent in the first direction.

An in-cell touch panel according to another present disclosure has an image display region made up of a plurality of pixels arranged in a first direction and a second direction intersecting the first direction. The in-cell touch panel includes: a transistor and a pixel electrode provided in each of the plurality of pixels; a plurality of common electrodes arranged in each of the first direction and the second direction, each facing one or more of the pixel electrodes and provided separately from each other; a plurality of gate lines extending along the first direction and each supplying a gate signal to the transistor in each of the plurality of pixels; a plurality of data lines extending along the second direction and each supplying a data signal to the transistor in each of the plurality of pixels; and a plurality of touch lines extending along the second direction and connected to respectively corresponding common electrodes, wherein the plurality of data lines and the plurality of touch lines are alternately provided one by one for each boundary between two pixels adjacent in the first direction, the plurality of pixels are made up of three types of pixels including a red pixel, a green pixel, and a blue pixel, and six pixels of the red pixel, the green pixel, the blue pixel, the blue pixel, the red pixel, and the green pixel are arranged in this order as one set repeatedly along the first direction.

BRIEF DESCRIPTION OF THE DRAWINGS

FIG. 4A is a diagram showing an example of image display driving and touch position detection driving in the in-cell touch panel;

FIG. 4B is a diagram showing another example of the image display driving and the touch position detection driving in the in-cell touch panel;

DETAILED DESCRIPTION

Figure 1:
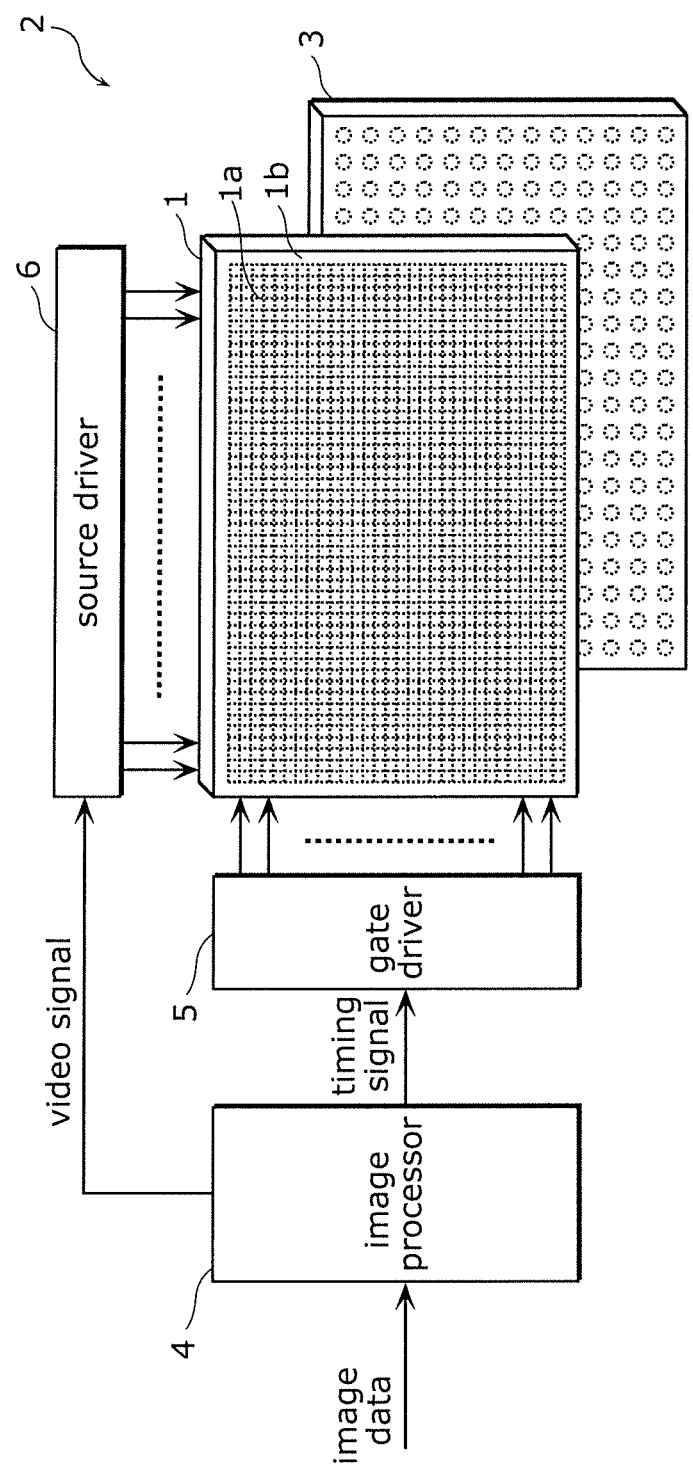
FIG. 1 is a diagram schematically showing a schematic configuration of an in-cell touch panel according to a first exemplary embodiment.

Hereinafter, exemplary embodiments will be described with reference to the drawings. The following exemplary embodiments provide comprehensive or specific examples of the present disclosure. Numerical values, shapes, materials, components, disposition positions of the components, connection modes of the components, steps, and order of the steps that are illustrated in the following exemplary embodiments are examples, and therefore are not intended to limit the present disclosure. Among the components in the following exemplary embodiments, the components that are not recited in the independent claims indicating the broadest concept are described as an optional component.

The drawings are schematic diagrams, and not necessarily strictly illustrated. In the drawings, substantially the same configuration is designated by the same reference numerals, and overlapping description will be omitted or simplified.

First Exemplary Embodiment

Figure 2:
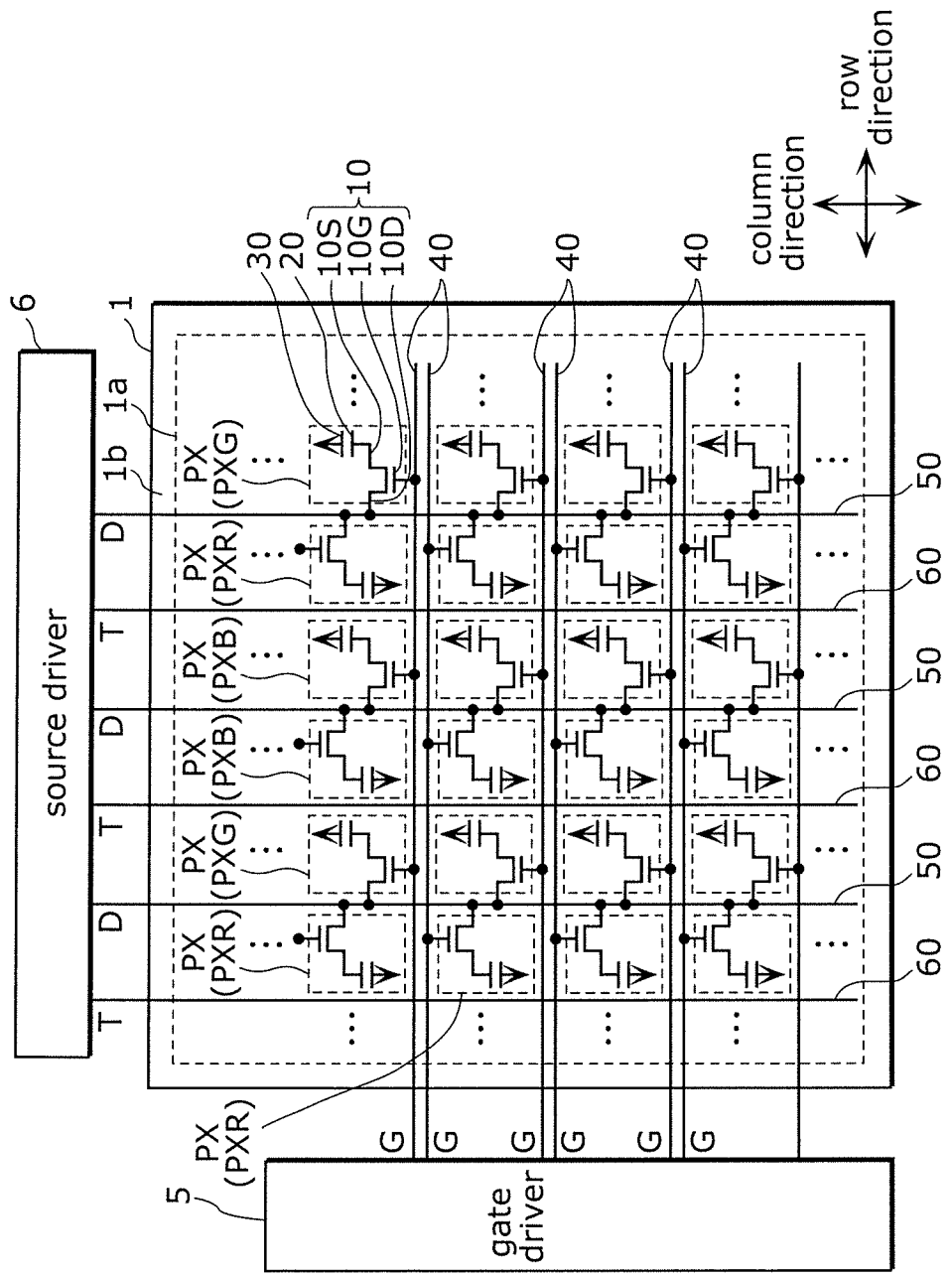
FIG. 2 is a diagram showing a pixel circuit of an in-cell touch panel used in the image display device according to the first exemplary embodiment.
Figure 3:
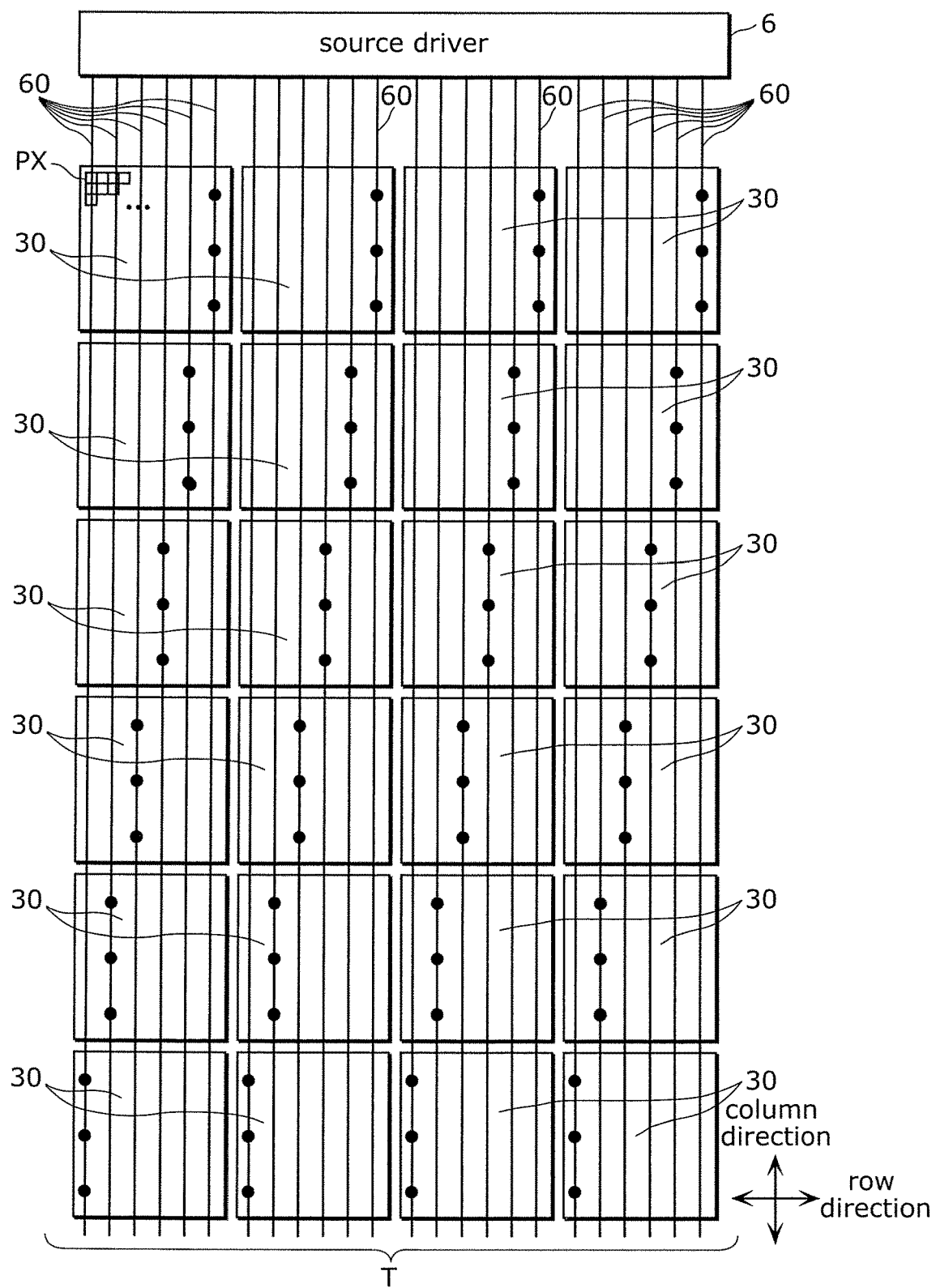
FIG. 3 is a diagram showing an example of an arrangement of common electrodes in the in-cell touch panel according to the first exemplary embodiment.

A schematic configuration of image display device 2 including in-cell touch panel 1 according to a first exemplary embodiment will be described with reference to FIGS. 1 to 3. FIG. 1 is a diagram schematically showing a schematic configuration of image display device 2 according to the first exemplary embodiment. FIG. 2 is a diagram showing a pixel circuit of in-cell touch panel 1 used in the same image display device 2. FIG. 3 is a diagram showing an example of the arrangement of common electrodes 30 in the same in-cell touch panel 1. In FIG. 2, "G" denotes gate line 40, "D" denotes data line 50, and "T" denotes touch line 60. In FIG. 3, black circles indicate contact portions between the respective common electrodes 30 and touch lines 60.

Image display device 2 is an example of a display device that displays an image (video) of a still image or a moving image. As shown in FIG. 1, image display device 2 includes in-cell touch panel 1, backlight 3, and image processing unit 4.

In-cell touch panel 1 is a liquid crystal display panel on which an image is displayed. In-cell touch panel 1 is disposed on a light emission side of backlight 3. Therefore, light emitted from backlight 3 enters in-cell touch panel 1.

A liquid crystal driving method of in-cell touch panel 1 is a horizontal electric field method such as an in-plane switching (IPS) method and a fringe field switching (FFS) method. In in-cell touch panel 1, for example, voltage control is performed by a normally black method, but the voltage control method is not limited to the normally black method.

As shown in FIGS. 1 and 2, in-cell touch panel 1 includes image display region 1a (active region) and frame region 1b surrounding image display region 1a. A color image or a monochrome image is displayed in image display region 1a.

Image display region 1a is a display region (effective region) in which an image is displayed, and includes, for example, a plurality of pixels PX arranged in a first direction and a second direction intersecting the first direction. In the present exemplary embodiment, the first direction and the second direction are orthogonal to each other. Specifically, the first direction is the row direction, and the second direction is the column direction orthogonal to the row direction. Therefore, image display region 1a is made up of a plurality of pixels PX arranged in the row direction and the column direction. That is, the plurality of pixels PX are arranged in a matrix.

Frame region 1b is a peripheral region of in-cell touch panel 1 and is located outside image display region 1a. Frame region 1b is a non-display region (invalid region) where no image is displayed. In the present exemplary embodiment, a planar view shape of in-cell touch panel 1 is a rectangular shape. Therefore, a planar view shape of image display region 1a is a rectangular shape, and a planar view shape of frame region 1b is a rectangular frame shape.

The plurality of pixels PX are made up of a plurality of types of pixels arranged periodically and repeatedly along the row direction. Specifically, the plurality of pixels PX are made up of three types of pixels including red pixel PXR, green pixel PXG, and blue pixel PXB.

In this case, in the present exemplary embodiment, the six pixels of red pixel PXR, green pixel PXG, blue pixel PXB, blue pixel PXB, red pixel PXR, and green pixel PXG are arranged in this order as one set repeatedly along the row direction. Note that the pixels PX of the same type are arranged in the column direction.

As shown in FIG. 2, in-cell touch panel 1 includes transistor 10 and pixel electrode 20 provided in each of the plurality of pixels PX, and common electrode 30 facing pixel electrode 20.

In-cell touch panel 1 includes a plurality of gate lines 40 (scanning lines) extending in the row direction that is the first direction, and a plurality of data lines 50 (video signal lines) extending in the column direction that is the second direction orthogonal to the first direction. Each pixel PX is a region surrounded by gate line 40 extending in the row direction and data line 50 extending in the column direction.

In-cell touch panel 1 in the present exemplary embodiment is an in-cell type liquid crystal display panel having not only a display function but also a touch function. Therefore, in-cell touch panel 1 further includes a plurality of touch lines 60 for detecting a touch position when the user touches in-cell touch panel 1. The plurality of touch lines 60 extend in the same direction as the plurality of data lines 50. Specifically, the plurality of touch lines 60 extend in the column direction.

Transistor 10 is a thin film transistor and includes gate electrode 10G, source electrode 10S, and drain electrode 10D. Note that in the present specification, source electrode 10S and drain electrode 10D may be collectively referred to as a source/drain electrode. The source/drain electrode means at least one of source electrode 10S or drain electrode 10D, only either source electrode 10S or drain electrode 10D, or both source electrode 10S and drain electrode 10D.

Pixel electrode 20 is provided in each of the plurality of pixels PX. Pixel electrode 20 is provided, for example, at an intersection of gate line 40 and data line 50. In each of the plurality of pixels PX, pixel electrode 20 is connected to data line 50 corresponding to pixel PX via transistor 10 corresponding to pixel PX.

In the present exemplary embodiment, one transistor 10 and one pixel electrode 20 are provided for each pixel PX. Note that a plurality of transistors 10 and a plurality of pixel electrodes 20 may be provided for each pixel PX.

Common electrode 30 is a counter electrode facing pixel electrode 20. As shown in FIG. 3, in the present exemplary embodiment, a plurality of common electrodes 30 are provided. The plurality of common electrodes 30 are arranged in each of the row direction and the column direction. That is, the plurality of common electrodes 30 are arranged in a matrix. The same common voltage (Vcom) is applied to each of the plurality of common electrodes 30.

Each of the plurality of common electrodes 30 has a rectangular shape and faces one or more pixel electrodes 20. In the present exemplary embodiment, each of the plurality of common electrodes 30 has a rectangular shape provided across the plurality of pixels PX, and faces the plurality of pixel electrodes 20 corresponding to the plurality of pixels PX existing in the rectangular region. For example, the plurality of common electrodes 30 are formed in a rectangular shape including a plurality of pixels PX each having several tens to several tens of sides.

In-cell touch panel 1 in the present exemplary embodiment is a liquid crystal display panel having a touch sensing function based on a self-capacitive capacitance method. Therefore, common electrode 30 is also a touch electrode that forms a capacitance with pixel electrode 20. That is, common electrode 30 is paired with pixel electrode 20 and is used not only at the time of image display driving but is also used at the time of touch position detection driving. Each of the plurality of common electrodes 30 is a unit electrode (touch electrode) for detecting a touch position.

For example, the size of one common electrode 30 is 40×40 pixels. That is, the length in each of the row direction and the column direction of one common electrode 30 is the length of 40 pixels. In this case, there are 40 contact portions with one touch line 60 in one common electrode 30. Note that the size of one common electrode 30 is not limited to this but may be 32×32 pixels. Further, the shape of one common electrode 30 is not limited to a square but may be a rectangle.

Each of the plurality of gate lines 40 extending in the row direction supplies a gate signal to transistor 10 in each of the plurality of pixels PX. Each of the plurality of gate lines 40 is provided at a boundary between two pixels PX adjacent in the column direction in the image display region 1a. Specifically, each gate line 40 is provided between two pixel columns adjacent in the column direction.

Each gate line 40 is connected to transistor 10 of each of the plurality of pixels PX arranged in the row direction. Each gate line 40 is connected to gate electrodes 10G of transistors 10.

In the present exemplary embodiment, in-cell touch panel 1 has a dual-gate structure and a 2G1D wiring connection structure. Therefore, two of the plurality of gate lines 40 are provided for each boundary between two pixels PX adjacent in the column direction.

The plurality of data lines 50 extending in the column direction supplies a data signal (video signal) to transistors 10 in the plurality of pixels PX. Each of the plurality of data lines 50 is provided at a boundary between two pixels PX adjacent in the row direction in the image display region 1a. Specifically, each data line 50 is provided between two pixel columns adjacent in the row direction.

Each data line 50 is connected to transistors 10 of each of the plurality of pixels PX arranged in the column direction. Each data line 50 is connected to drain electrodes 10D of transistors 10. That is, in the present exemplary embodiment, data line 50 is a drain line.

Each of the plurality of touch lines 60 extending in the column direction is provided at the boundary between two pixels PX adjacent in the row direction in the image display region 1a, similarly to data line 50. Specifically, touch line 60 is provided between two pixel columns adjacent in the row direction.

As shown in FIG. 3, the plurality of touch lines 60 are connected one-by-one to the plurality of common electrodes 30 arranged in the column direction among the plurality of common electrodes 30. Specifically, each of the plurality of touch lines 60 (column touch line group) corresponding to the plurality of common electrodes 30 arranged in one column is provided so as to traverse all of the plurality of common electrodes 30 included in the column. Each of the plurality of touch lines 60 is connected to only one of the plurality of common electrodes 30 included in the column. Therefore, each common electrode 30 is connected to any one of the plurality of touch lines 60 traversing common electrode 30, but is not connected to and is insulated from the other remaining touch lines 60. The number of touch lines 60 straddling the common electrodes 30 arranged in the column direction may only be the same as that of the common electrodes 30 arranged in the column direction.

As will be described in detail later, touch line 60 and common electrode 30 are formed via an insulating film, and touch line 60 and common electrode 30 corresponding to touch line 60 are connected via a contact hole formed in the insulating film. This contact hole becomes a contact portion that connects touch line 60 and common electrode 30.

Data lines 50 and touch lines 60 are alternately and repeatedly provided, and a corresponding either one of data lines 50 and touch lines 60 is provided for every boundary between two pixels PX adjacent in the row direction. Specifically, data lines 50 are provided for every two pixel columns adjacent in the row direction (every two columns), and touch lines 60 are provided for every two pixel columns adjacent in the row direction so as to be arranged alternately. For example, when data line 50 is provided in an odd-numbered column of pixel PX, touch line 60 is provided in an even-numbered column of pixel PX. On the contrary, when data line 50 is provided in the even-numbered row of pixel PX, touch line 60 is provided in the odd-numbered row of pixel PX.

As shown in FIG. 1, in-cell touch panel 1 includes gate driver 5 and source driver 6 in order to display an image corresponding to an input video signal. Gate driver 5 and source driver 6 are driver Integrated circuits (ICs) (IC packages), for example.

Gate driver 5 and source driver 6 are mounted in frame region 1*b* of in-cell touch panel 1. Specifically, gate driver 5 and source driver 6 are mounted at the end of in-cell touch panel 1 by a chip-on-film (COF) method or a chip-on-glass (COG) method.

When gate driver 5 and source driver 6 are mounted by the COF method, a COF made of an anisotropic conductive film (ACF), in which gate driver 5 or source driver 6 is mounted on a flexible wiring board such as a flexible flat cable (FFC) or a flexible printed cable (FPC), is connected to an electrode terminal provided at an end of in-cell touch panel 1 by thermal press fitting.

On the other hand, when gate driver 5 and source driver 6 are mounted by the COG method, gate driver 5 and source driver 6 are directly mounted on an active matrix substrate of in-cell touch panel 1.

Note that both gate driver 5 and source driver 6 are not limited to be mounted by the COF method or the COG method, and one of gate driver 5 and source driver 6 may be mounted by the COF method and the other may be mounted by the COG method.

As shown in FIG. 2, gate driver 5 is electrically connected to gate line 40. Gate driver 5 selects pixel PX where a data signal is to be written in accordance with a timing signal input from image processing unit 4, and supplies a gate line 40 with a voltage (gate-on voltage; Vgon) for turning on transistor 10 of the selected pixel PX. Thereby, a data voltage is supplied to pixel electrode 20 of the selected pixel PX via transistor 10.

Source driver 6 is connected to data line 50 of in-cell touch panel 1. Source driver 6 supplies a voltage (data voltage) corresponding to a video signal input from image processing unit 4 to data line 50 in accordance with the selection of gate line 40 by gate driver 5.

In the present exemplary embodiment, a source driver with a touch function is used as source driver 6. The source driver with a touch function is a driver in which an image display circuit necessary for performing image display driving and a touch position detection circuit necessary for performing touch position detection driving are shared. In the present exemplary embodiment, the plurality of data lines 50 and the plurality of touch lines 60 are connected to source driver 6 that is a source driver with a touch function. Further, the source driver with a touch function supplies a common voltage (Vcom) to common electrode 30.

Gate driver 5 is mounted, for example, at the end of in-cell touch panel 1 on the row-direction side. Further, source driver 6 is mounted, for example, at the end of in-cell touch panel 1 on the column-direction side. Note that the mounting locations of gate driver 5 and source driver 6 are not limited to the above, but both gate driver 5 and source driver 6 may be mounted at the same end of in-cell touch panel 1 on the column-direction side, or may be mounted at the same end of in-cell touch panel 1 on the row-direction side.

As shown in FIG. 1, backlight 3 is disposed on the back surface side of in-cell touch panel 1 and irradiates in-cell touch panel 1 with light. In the present exemplary embodiment, backlight 3 is a light-emitting diode (LED) backlight including an LED as a light source, but is not limited to this. Backlight 3 is a direct type LED backlight in which LEDs are two-dimensionally arranged on a substrate so as to face in-cell touch panel 1, but may be an edge type backlight. Backlight 3 is a surface emitting unit that applies flat and uniform scattered light (diffused light). Backlight 3 may have an optical member such as a diffusion plate (diffusion sheet) in order to diffuse light from the light source.

Image processing unit 4 is a control device that includes an arithmetic processing circuit such as a central processing unit (CPU) and a memory such as a read-only memory (ROM) and a random-access memory (RAM). Video data to be displayed on in-cell touch panel 1 is input into image processing unit 4. In image processing unit 4, the CPU reads out and executes a program stored in the memory, thereby executing various processes. Specifically, image processing unit 4 includes a timing controller or the like that performs various image signal processing, such as color adjustment, on video data input from an external system (not shown) and generates a video signal indicating a gradation value of each pixel PX and a timing signal indicating the timing for writing the video signal into each pixel PX. Image processing unit 4 outputs the video signal to source driver 6 and outputs the timing signal to gate driver 5.

In-cell touch panel 1 according to the present exemplary embodiment has a display function and a touch function. That is, in-cell touch panel 1 performs image display driving and touch position detection driving. In this case, in-cell touch panel 1 uses touch line 60 to perform image display driving and touch position detection driving by time division. For example, as shown in FIGS. 4A and 4B, image display driving and touch position detection driving are alternately repeated a plurality of times within one frame period (16.6 ms). In this case, the touch position detection driving can be performed using, for example, a blanking period.

When in-cell touch panel 1 performs the image display driving, the gate-on voltage from gate driver 5 is supplied to gate line 40. Thereby, transistor 10 of the selected pixel PX is turned on, and the data voltage is supplied to pixel electrode 20 from data line 50 connected to transistor 10. An electric field is generated in the liquid crystal layer due to the difference between the data voltage supplied to pixel electrode 20 and the common voltage supplied to common electrode 30. This electric field changes an alignment state of liquid crystal molecules in the liquid crystal layer in each pixel PX, and the light transmittance of backlight 3 passing through in-cell touch panel 1 is controlled for each pixel PX. Thereby, a desired image is displayed in image display region 1*a* of in-cell touch panel 1.

Further, when in-cell touch panel 1 performs the touch position detection driving, source driver 6 which is a source driver with a touch function detects a change in capacitance of each of the plurality of common electrodes 30 as a touch detection signal via touch line 60. Thereby, common electrode 30 at the touched position can be specified, and the position touched by the user can be detected.

Note that the control shown in FIG. 4B has a long driving period per image display driving and touch position detection driving as compared to the control shown in FIG. 4A. In the present exemplary embodiment, either the control shown in FIG. 4B or the control shown in FIG. 4A may be used. However, as compared to the control in FIG. 4A, in the control shown in FIG. 4B, the amount of image data stored into the memory during the touch position detection driving increases, and hence the chip size of the IC driver increases.

Figure 5:
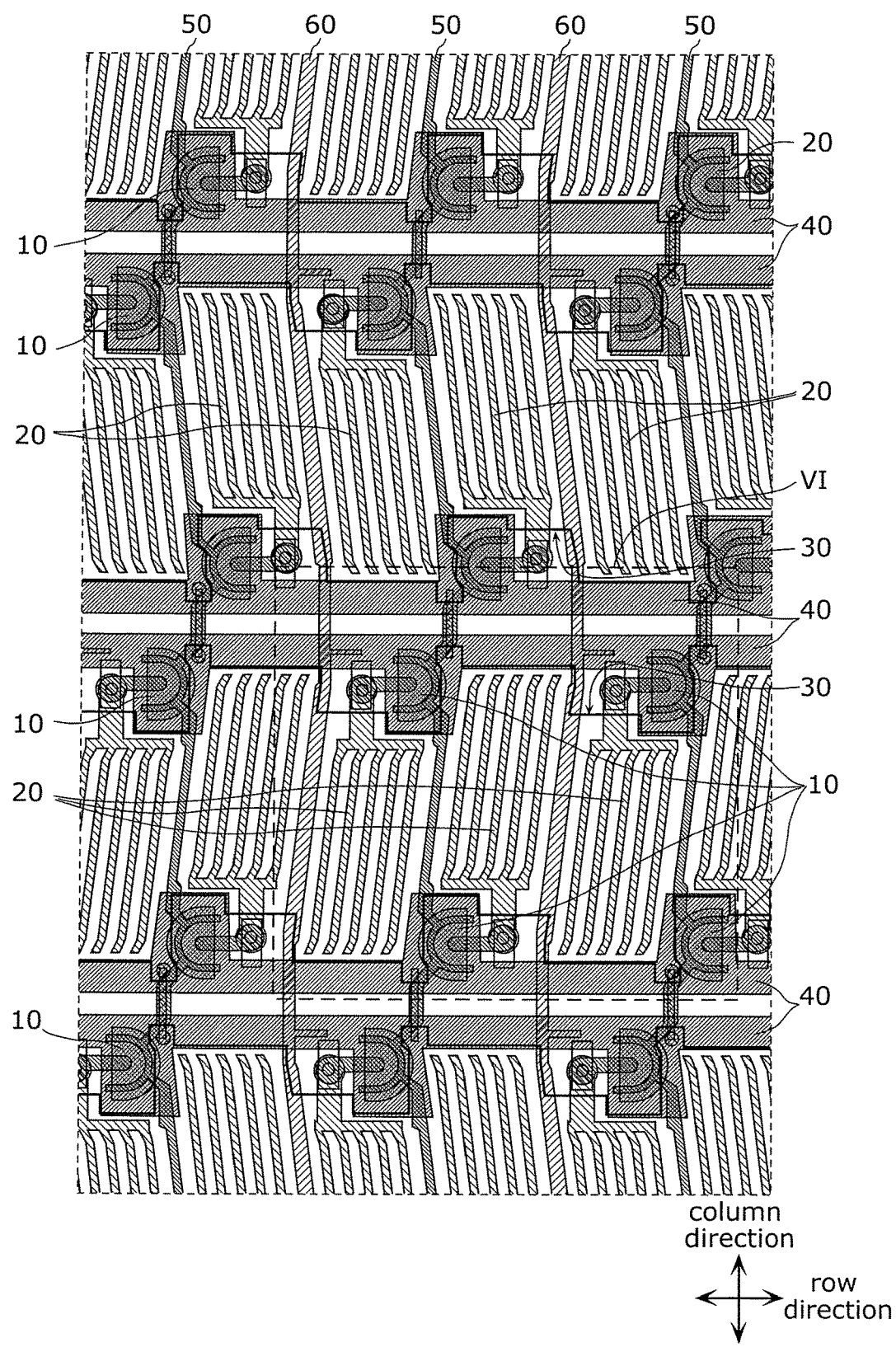
FIG. 5 is a plan view showing an example of the configuration of pixels in the in-cell touch panel according to the first exemplary embodiment.
Figure 6:
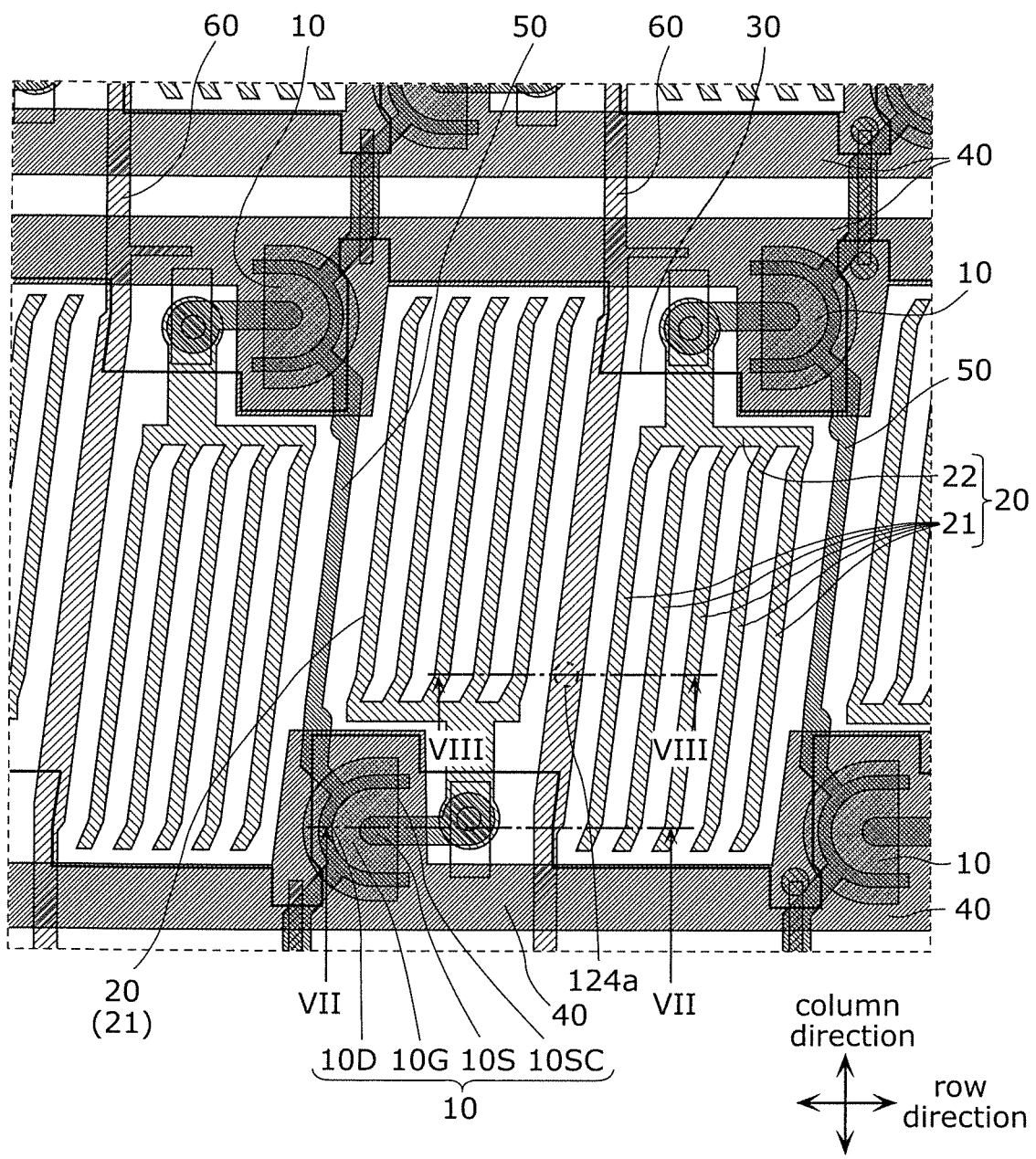
FIG. 6 is an enlarged plan view of the in-cell touch panel according to the first exemplary embodiment in a region VI surrounded by a broken line in FIG. 5.

Next, an example of the pixel configuration of in-cell touch panel 1 will be described with reference to FIGS. 5 and 6. FIG. 5 is a plan view showing an example of the configuration of pixel PX in in-cell touch panel 1 according to the first exemplary embodiment. FIG. 6 is an enlarged view of a region VI surrounded by a broken line in FIG. 5.

As shown in FIGS. 5 and 6, each pixel PX is provided with one transistor 10 and one pixel electrode 20.

A plurality of slits are formed in each pixel electrode 20, and each pixel electrode 20 has a plurality of line electrodes 21 extending in a stripe shape in the column direction. Each of the plurality of line electrodes 21 has a strip shape, and a plurality of slits extending in the column direction are formed in pixel electrode 20 to form a stripe shape. In each pixel electrode 20, all the line electrodes 21 are formed substantially in parallel, and an interval (slit width) between two adjacent line electrodes 21 is constant. Further, in each pixel electrode 20, the intervals of all the line electrodes 21 are the same. In each pixel PX, one ends in the longitudinal direction of the plurality of line electrodes 21 are coupled by a coupling electrode 22 extending along the row direction. That is, pixel electrode 20 in the present exemplary embodiment has a comb shape.

The line electrode 21 is inclined with respect to the row direction and the column direction in each pixel PX. In this case, in the present exemplary embodiment, the direction of the line electrode 21 is inverted between two pixels PX adjacent in the column direction, and the line electrodes 21 are formed to have a bend shape in two columns in the column direction. That is, the plurality of pixel electrodes 20 arranged in the column direction are formed to have a zigzag shape along the column direction. Note that the line electrode 21 may be formed in parallel to the column direction without being inclined.

The plurality of gate lines 40 extend linearly in the row direction. As described above, since in-cell touch panel 1 in the present exemplary embodiment has a dual-gate structure, two gate lines are provided at the boundary between two pixels PX adjacent in the column direction.

The plurality of data lines 50 extend in the column direction along the shape of the line electrode 21 of pixel electrode 20. Specifically, each data line 50 is inverted in direction by two pixels PX adjacent in the column direction, and is formed to have a bend shape for two pixels in the column direction. That is, each data line 50 is formed to have a zigzag shape along the column direction. Note that the plurality of gate lines 40 may extend linearly in the column direction.

Similarly to data lines 50, the plurality of touch lines 60 extend in the column direction along the shape of the line electrode 21 of pixel electrode 20. Specifically, each touch line 60 is inverted in direction by two pixels PX adjacent in the column direction, and is formed to have a bend shape for two pixels in the column direction. That is, each touch line 60 is formed to have a zigzag shape along the column direction. Note that the plurality of touch lines 60 may extend linearly in the column direction.

Figure 7:
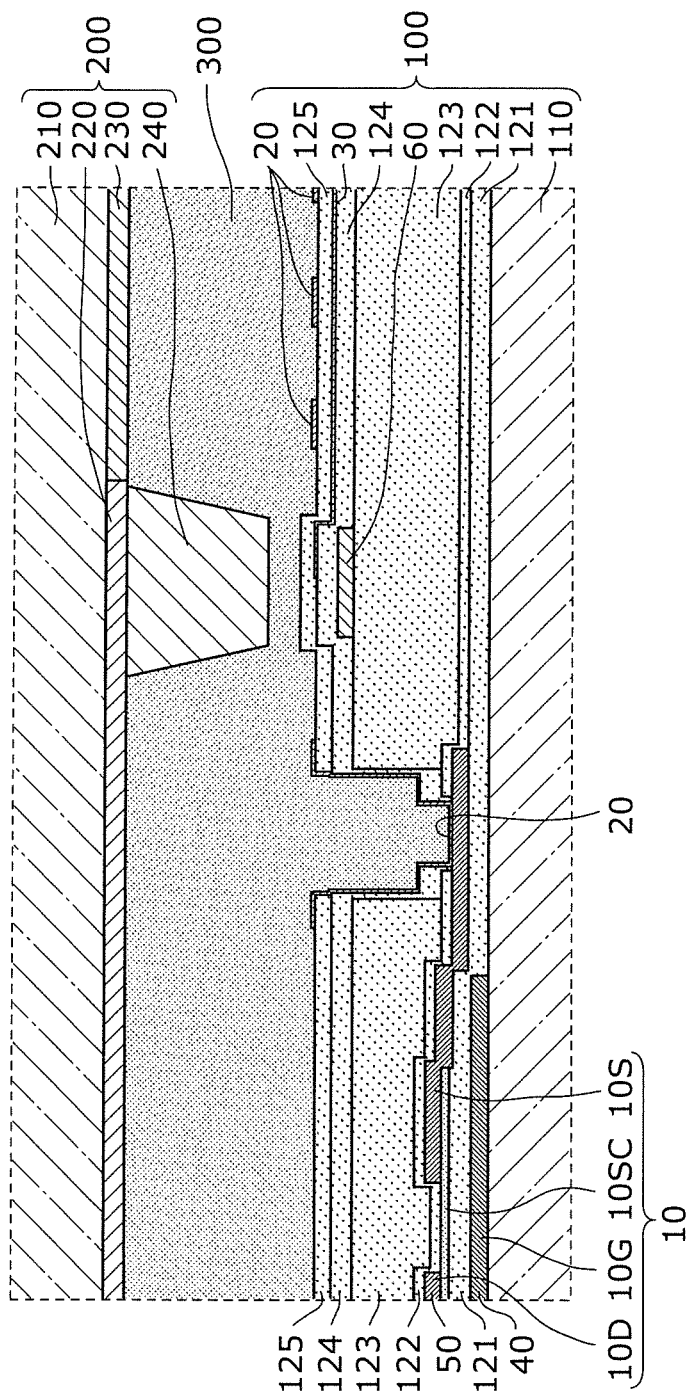
FIG. 7 is a cross-sectional view of the in-cell touch panel according to the first exemplary embodiment taken along line VII-VII in FIG. 6.

Next, the cross-sectional structure of in-cell touch panel 1 will be described using FIGS. 7 and 8 with reference to FIGS. 5 and 6. FIG. 7 is a cross-sectional view of in-cell touch panel 1 taken along line VII-VII in FIG. 6 FIG. 8 is a cross-sectional view of in-cell touch panel 1 taken along line VIII-VIII in FIG. 6.

Figure 8:
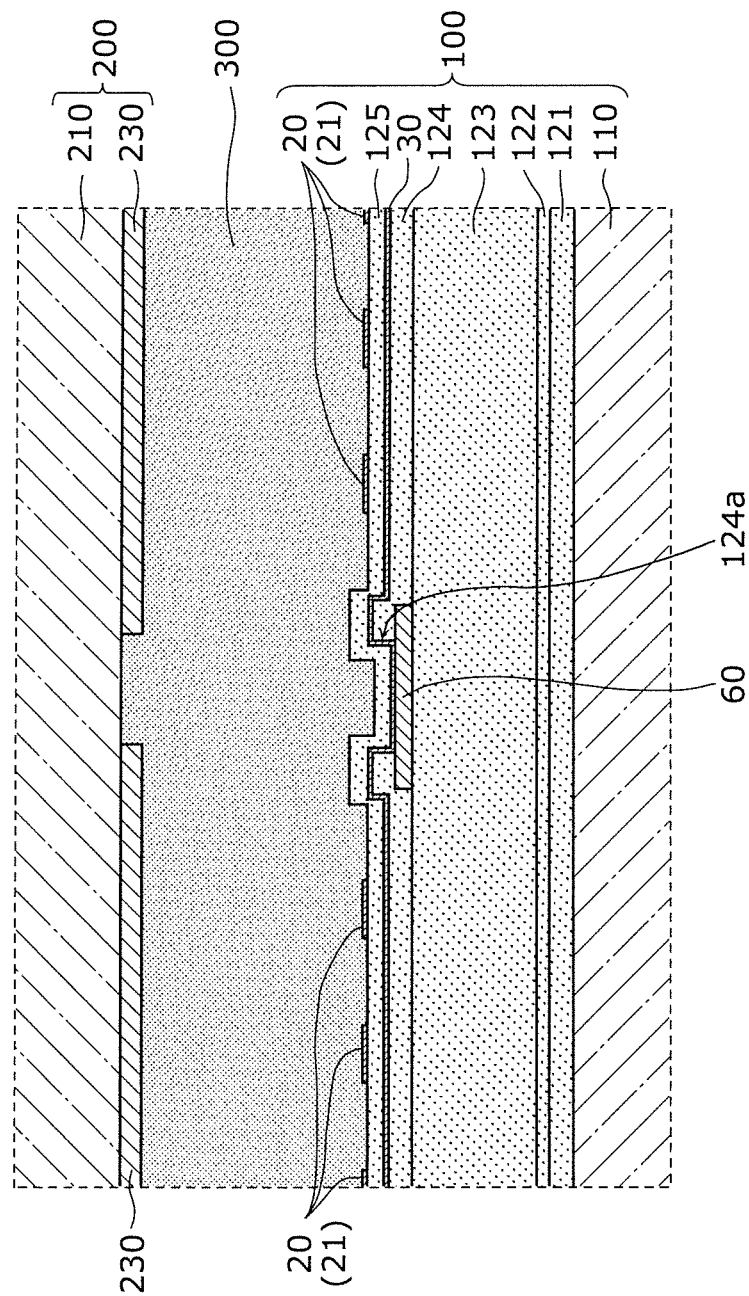
FIG. 8 is a cross-sectional view of the in-cell touch panel according to the first exemplary embodiment taken along line VIII-VIII in FIG. 6.

As shown in FIGS. 7 and 8, in-cell touch panel 1 includes first substrate 100, second substrate 200 facing first substrate 100, and liquid crystal layer 300 disposed between first substrate 100 and second substrate 200. In the present exemplary embodiment, first substrate 100 is located on the backlight 3 side, and second substrate 200 is located on the observer side. Although not shown, liquid crystal layer 300 is sealed between first substrate 100 and second substrate 200 by a frame-shaped sealing member.

First substrate 100 is a TFT substrate having a TFT as transistor 10. Specifically, first substrate 100 is an active matrix substrate in which a plurality of transistors 10 are arranged in a matrix. First substrate 100 includes not only transistor 10 but also various wires such as gate line 40, data line 50, and touch line 60, an insulating film that insulates the wires, pixel electrode 20, common electrode 30, and the like. These members are formed on first transparent substrate 110. First transparent substrate 110 is a transparent substrate such as a glass substrate, for example.

As shown in FIG. 7, transistor 10 formed on first transparent substrate 110 includes gate electrode 10G, source electrode 10S, drain electrode 10D, and semiconductor layer 10SC serving as a channel layer. In the present exemplary embodiment, transistor 10 is a TFT having a bottom gate structure, and includes gate electrode 10G formed on first transparent substrate 110, first insulating film 121 that is a gate insulator (GI) formed on gate electrode 10G, and semiconductor layer 10SC formed above gate electrode 10G via first insulating film 121. Source electrode 10S and drain electrode 10D are formed so as to cover a part of semiconductor layer 10SC. First insulating film 121 is formed over the entire surface of first transparent substrate 110 so as to cover gate electrode 10G.

For example, gate electrode 10G may be made of a metal film having a two-layer structure of a molybdenum film and a copper film, or may be made of a single-layer metal film made of a copper film or the like. First insulating film 121 may be made up of, for example, an insulating film having a two-layer structure of a silicon oxide film and a silicon nitride film, or may be made up of a single insulating film of a silicon oxide film or a silicon nitride film. For example, semiconductor layer 10SC may be made up of a semiconductor film having a two-layer structure of an i-amorphous silicon film and an n-amorphous silicon film, or may be made up of a semiconductor film having only one layer of the i-amorphous silicon film. For example, source electrode 10S and drain electrode 10D may be formed of a metal film having a two-layer structure of a molybdenum film and a copper film, or may be formed of a single metal film made of a copper film or the like.

Note that the materials of gate electrode 10G, source electrode 10S, drain electrode 10D, semiconductor layer 10SC, and first insulating film 121 are not limited to these. For example, as a material of semiconductor layer 10SC, an In—Ga—Zn—O-based oxide semiconductor or the like may be used.

As shown in FIG. 7, gate line 40 and data line 50 are formed on first substrate 100. Gate line 40 and data line 50 are formed on first transparent substrate 110.

Gate line 40 is formed in the same layer as gate electrode 10G. That is, gate line 40 and gate electrode 10G are formed by patterning the same metal film. Gate line 40 and gate electrode 10G are formed in a first wiring layer (GAL layer) that is a metal layer.

Data line 50 is formed in the same layer as source electrode 10S and drain electrode 10D. That is, data line 50, source electrode 10S, and drain electrode 10D are formed by patterning the same metal film. Data line 50, source electrode 10S, and drain electrode 10D are formed in a second wiring layer (SD layer) that is a metal layer on the first wiring layer.

A first insulating film 121 is formed as a first insulating layer (GI layer) between the first wiring layer (GAL layer) and the second wiring layer (SD layer). First insulating film 121 is formed over the entire surface of first transparent substrate 110 so as to cover gate line 40 and gate electrode 10G. The first wiring layer, first insulating film 121, and the second wiring layer are TFT layers where transistor 10 which is a TFT is formed.

Note that source electrode 10S of transistor 10 is connected to pixel electrode 20 through a contact hole. Meanwhile, drain electrode 10D of transistor 10 is connected to data line 50. Specifically, a part of data line 50 is drain electrode 10D.

On first insulating film 121, second insulating film 122 is formed as a second insulating layer (PAS layer) so as to cover data line 50 and the source and drain electrodes of transistor 10. That is, data line 50 and the source and drain electrodes of transistor 10 are formed between first insulating film 121 and second insulating film 122. Second insulating film 122 is formed over the entire surface of first insulating film 121. Second insulating film 122 is configured of an inorganic insulating film made of an inorganic material such as a silicon nitride film, for example. Second insulating film 122, which is an inorganic insulating film, can be formed by, for example, a chemical vapor deposition (CVD) method.

Further, on second insulating film 122, third insulating film 123 is formed as a third insulating layer (OPAS layer). Third insulating film 123 is formed over the entire surface of second insulating film 122. In the present exemplary embodiment, a thickness of third insulating film 123 is larger than a thickness of second insulating film 122. Specifically, the thickness of third insulating film 123 is 10 times or more the thickness of second insulating film 122, and is 3000 nm as an example. Thereby, the distance in the thickness direction between the wire such as gate line 40 and data line 50 and common electrode 30 can be increased, so that a parasitic capacitance formed by the wire such as gate line 40 and data line 50 and common electrode 30 can be reduced. In addition, by increasing the thickness of third insulating film 123, the irregularities of the TFT layer caused by forming transistor 10, gate line 40, and data line 50 can be reduced, to planarize the TFT layer. As a result, third insulating film 123 having a planarized surface can be formed, so that common electrode 30 immediately above third insulating film 123 can be formed in a flat planar shape. That is, third insulating film 123 functions as a planarized layer.

Third insulating film 123 is configured of an organic insulating film made of an organic material containing carbon. Third insulating film 123, which is an organic insulating film, can be formed, for example, by applying and curing a liquid organic material. Thus, third insulating film 123 can be easily thickened, and the surface of third insulating film 123 can be easily planarized over all pixels PX.

Touch line 60 is formed on third insulating film 123. Touch line 60 is made of a low-resistance material such as metal. For example, touch line 60 is a metal film made of copper or the like. In the present exemplary embodiment, the touch line 60 is a copper wire made of a copper film. Touch line 60 is formed in a third wiring layer (CMT layer) that is a metal layer on the second wiring layer. Hence touch line 60 is provided in a different layer from gate line 40 and data line 50.

On third insulating film 123 and touch line 60, fourth insulating film 124 is formed as a fourth insulating layer (TPS layer). Fourth insulating film 124 is formed over the entire surface of third insulating film 123 so as to cover touch line 60. Accordingly, touch line 60 is formed between third insulating film 123 and fourth insulating film 124. For example, an inorganic insulating film made of an inorganic material such as a silicon nitride film constitutes fourth insulating film 124.

On fourth insulating film 124, common electrode 30 is formed. Common electrode 30 is a transparent electrode made of a transparent metal oxide such as indium tin oxide (ITO). In the present exemplary embodiment, common electrode 30 is an ITO film. Common electrode 30 is formed in the fourth wiring layer (MIT layer) above the third wiring layer.

In the present exemplary embodiment, a plurality of common electrodes 30 are formed. Specifically, as shown in FIG. 3, the common electrodes 30 are arranged in a matrix in a state of being separated from each other in the row direction and the column direction. In this case, the two common electrodes 30 adjacent in the column direction are separated from each other, with a region on gate line 40 as a separation region. Two common electrodes 30 adjacent in the row direction are separated from each other with a region on data line 50 as a separation region.

Further, the plurality of common electrodes 30 are formed over all the pixels PX in the image display region 1a. Thereby, the wiring of gate line 40, data line 50, and the like is covered by common electrode 30, so that the electric field generated in the wiring of gate line 40, data line 50, and the like can be shielded by common electrode 30. That is, the electric field generated in the TFT layer can be shielded by common electrode 30. Accordingly, the flexibility in designing the shape and size of pixel electrode 20 formed on common electrode 30 is improved, thereby facilitating improvement in light transmittance and the aperture ratio of pixel PX.

As shown in FIG. 8, common electrode 30 is connected to one touch line 60 via contact hole 124a formed in fourth insulating film 124. Thereby, at the time of performing the touch position detection driving, a change in capacitance of common electrode 30 at the position touched by the user can be detected via touch line 60 connected to common electrode 30. Contact hole 124a that connects common electrode 30 and touch line 60 can be formed by performing dry etching or wet etching on fourth insulating film 124, for example. Note that a material constituting common electrode 30 (ITO in the present exemplary embodiment) is embedded in contact hole 124a.

In addition, although the ITO film has a relatively high resistance value, the resistance of common electrode 30 made of the ITO film can be reduced by connecting the touch line 60 made of a low-resistance metal film to common electrode 30, whereby a time constant of common electrode 30 can be lowered. That is, at the time of performing image display driving, touch line 60 can be used as a common line.

Furthermore, by providing common electrode 30 on touch line 60, touch line 60 can be covered with common electrode 30. Thereby, as compared to a case where the touch line 60 is provided on common electrode 30, corrosion of the touch line 60 made of a metal material that is easily corroded can be prevented.

On fourth insulating film 124 and common electrode 30, fifth insulating film 125 is formed as a fifth insulating layer (UPS layer). Fifth insulating film 125 is formed over the entire surface of fourth insulating film 124 so as to cover common electrode 30. Fifth insulating film 125 is made of an inorganic insulating film made of an inorganic material such as a silicon nitride film, for example.

On fifth insulating film 125, pixel electrode 20 is formed. Pixel electrode 20 faces common electrode 30 with fifth insulating film 125 placed therebetween. Pixel electrode 20 is a transparent electrode made of a transparent metal oxide such as indium tin oxide. In the present exemplary embodiment, pixel electrode 20 is an indium tin oxide (ITO) film like common electrode 30. Pixel electrode 20 is formed in a fifth wiring layer (PIT layer) on the fourth wiring layer.

Although not shown, an alignment film may be formed over the entire surface of fifth insulating film 125 so as to cover pixel electrode 20. In order to align initial alignment angles of the liquid crystal molecules in a certain direction, the alignment film is subjected to rubbing treatment.

Next, second substrate 200 will be described. Second substrate 200 is a counter substrate facing first substrate 100. As shown in FIGS. 7 and 8, second substrate 200 includes second transparent substrate 210, black matrix 220 formed on second transparent substrate 210, and color filter 230. Therefore, second substrate 200 is a color filter substrate (CF substrate) having color filter 230.

Similarly to first transparent substrate 110, second transparent substrate 210 is a transparent substrate such as a glass substrate, for example.

Black matrix 220 is a black light-shielding layer, and is made of carbon black, for example. Black matrix 220 is formed on the surface of the second transparent substrate 210 on the liquid crystal layer 300 side. Black matrix 220 is formed so as to cover gate line 40. Note that black matrix 220 may be formed so as to cover not only gate lines 40 but also data lines 50 and touch lines 60. In this case, black matrix 220 is formed in a lattice shape as a whole. Color filter 230 is formed for each of the plurality of pixels PX.

Specifically, color filter 230 includes a red color filter, a blue color filter, and a green color filter corresponding to red pixel PXR, green pixel PXG, and blue pixel PXB, respectively. Each color filter is formed in a region between black matrices 220 (i.e., openings of black matrix 220).

Second substrate 200 includes a plurality of spacers 240. Spacer 240 is formed on second transparent substrate 210 so as to protrude toward first substrate 100. Spacer 240 is a columnar member for keeping a gap between first substrate 100 and second substrate 200 (cell gap) uniform. By providing spacer 240, the thickness of liquid crystal layer 300 can be easily kept uniform. As an example, spacer 240 has a cylindrical trapezoidal shape, and planar view shapes of the upper end and the lower end are circular. Spacer 240 is made of a resin material such as acrylic resin and can be deformed elastically. Spacer 240 can be formed in a predetermined pattern by, for example, photolithography.

To in-cell touch panel 1, a pair of polarizing plates (not shown) is attached. For example, one of the pair of polarizing plates is formed on the outer surface of first substrate 100, and the other of the pair of polarizing plates is formed on the outer surface of second substrate 200. The pair of polarizing plates are disposed so that the polarization directions are orthogonal to each other. A retardation plate may be bonded to the pair of polarizing plates.

Figure 9:
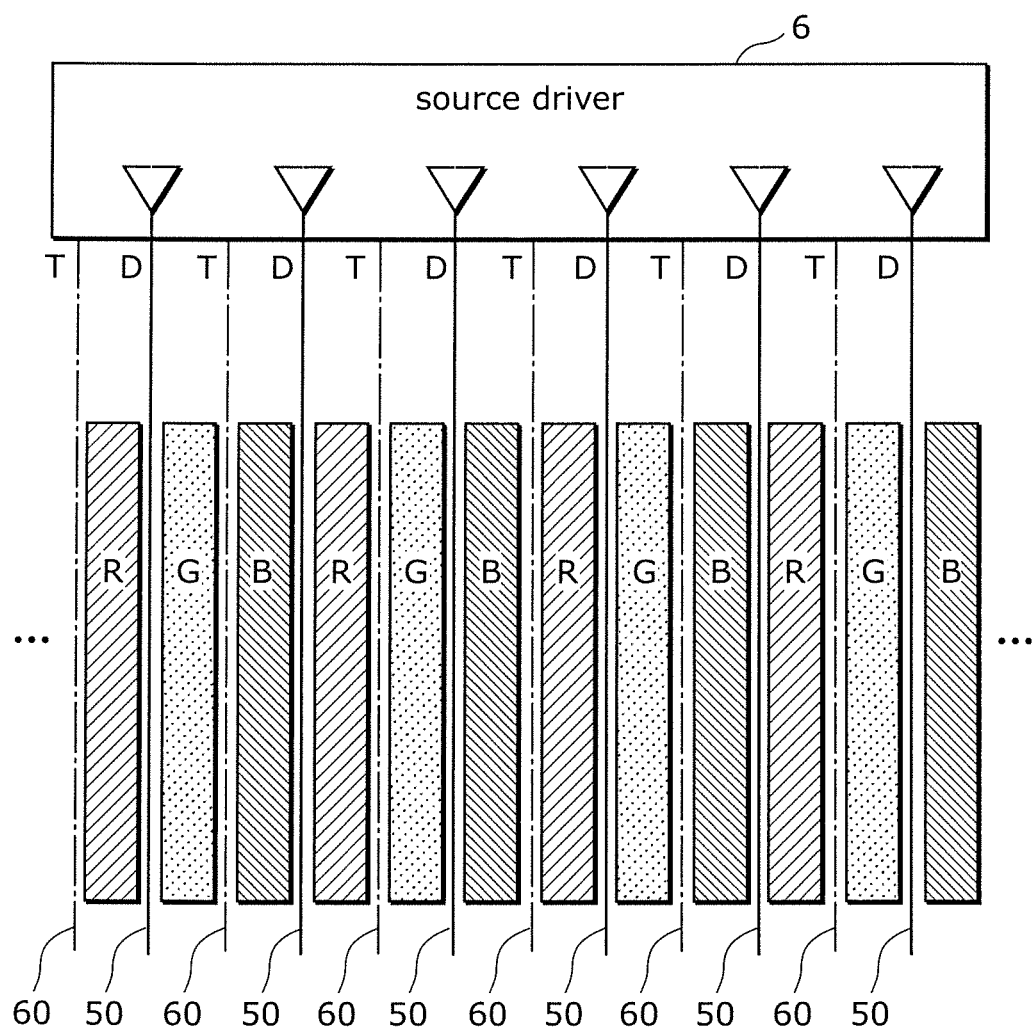
FIG. 9 is a diagram showing a relationship between a pixel array and wiring in an in-cell touch panel of a comparative example.
Figure 10:
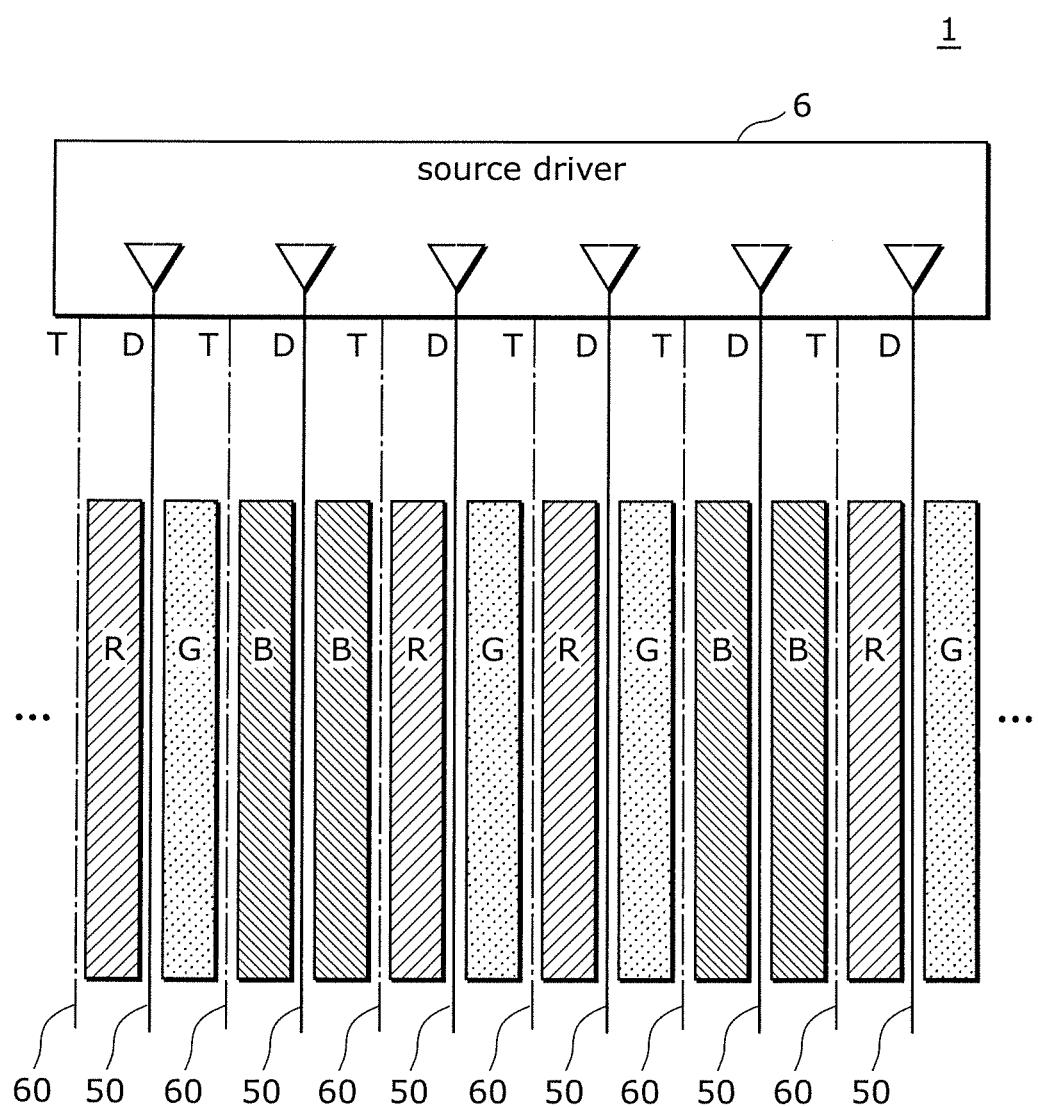
FIG. 10 is a diagram showing a relationship between a pixel array and wiring in the in-cell touch panel according to the first exemplary embodiment.

Next, the effects and the like of in-cell touch panel 1 according to the exemplary embodiment will be described with reference to FIGS. 9 and 10, including the background of the present disclosure. FIG. 9 is a diagram showing a relationship between a pixel array and wiring in in-cell touch panel 1X of a comparative example. FIG. 10 is a diagram showing a relationship between a pixel array and wiring in in-cell touch panel 1 according to the first exemplary embodiment. In FIGS. 9 and 10, a solid line corresponding to "D" indicates data line 50, and a one-dot chain line corresponding to "T" indicates touch line 60. Regions denoted by "R", "G", and "B" indicate the pixel column of red pixel PXR, the pixel column of green pixel PXG, and the pixel column of blue pixel PXB, respectively.

In recent years, an in-cell type liquid crystal display device (in-cell touch panel) having a touch function has been studied. In the in-cell touch panel of this type, as wiring, a touch line for detecting a touch position is provided in addition to a gate line and a data line for displaying an image. In this case, in order to connect the data line and the touch line to the source driver with a touch function mounted on the end of the in-cell touch panel on the column-direction side, it is conceivable that both the touch line and the data line extend along the column direction. Specifically, it is conceivable that the touch lines and the data lines are cyclically and repeatedly arranged in the row direction.

For example, it is conceivable that as in-cell touch panel 1X of the comparative example shown in FIG. 9, touch lines 60 and data lines 50 are alternately and repeatedly arranged one by one for each boundary between two pixel columns adjacent in the column direction.

However, it has been found that the image quality deteriorates when the configuration is formed as in in-cell touch panel 1X of the comparative example shown in FIG. 9.

The inventor of the present disclosure has examined this point, to find that geometric optical unevenness occurs due to the arrangement cycle of three RGB pixels. That is, the following has been found: in in-cell touch panel 1X of the comparative example, since the three pixels of red pixel PXR, green pixel PXG, and blue pixel PXB are arranged as one set repeatedly in the column direction, when touch line 60X and data line 50X are alternately arranged one by one for each boundary between two pixel columns, the geometric optical unevenness occurs due to the arrangement cycle of the three pixels of RGB and the arrangement cycle of the wiring of touch line 60X and data line 50X.

Therefore, the inventors of the present application have made extensive studies to solve this problem. As a result, it has been found that the generation of geometric optical unevenness can be prevented by devising the arrangement cycle of three RGB pixels.

Specifically, in in-cell touch panel 1 according to the present exemplary embodiment, as shown in FIG. 10, six pixels of red pixel PXR, green pixel PXG, blue pixel PXB, blue pixel PXB, red pixel PXR, and green pixel PXG are arranged in this order as one set repeatedly along the row direction. That is, three types of pixels PX including red pixel PXR, green pixel PXG, and blue pixel PXB, are arranged with the arrangement of RGBBRG as one cycle. In FIG. 10, two cycles are shown with RGBBRG as one cycle.

Further, in the configuration of the pixel array and wiring configuration shown in FIG. 10, in each of red pixel PXR and green pixel PXG, the wiring (touch line 60 or data line 50) existing on one side in the row direction and the wiring (touch line 60 or data line 50) existing on the other side have the same relationship. Specifically, for any red pixel PXR, touch line 60 exists on one side in the row direction, and data line 50 exists on the other side in the row direction. For any green pixel PXG, data line 50 exists on one side in the row direction, and touch line 60 exists on the other side in the row direction.

Thus, by forming the relationship between the pixel array and the wiring is configured as shown in FIG. 10, even when touch lines 60 and data lines 50 are alternately and repeatedly arranged one by one for each boundary between two pixel columns adjacent in the column direction, the occurrence of geometric optical unevenness can be prevented.

Therefore, even when touch line 60 and data line 50 extend in the same direction, it is possible to achieve in-cell touch panel 1 and image display device 2 that can prevent degradation in image quality. In particular, according to in-cell touch panel 1 and image display device 2 in the present exemplary embodiment, it is possible to effectively prevent color unevenness during monochromatic raster display.

Second Exemplary Embodiment

Figure 11:
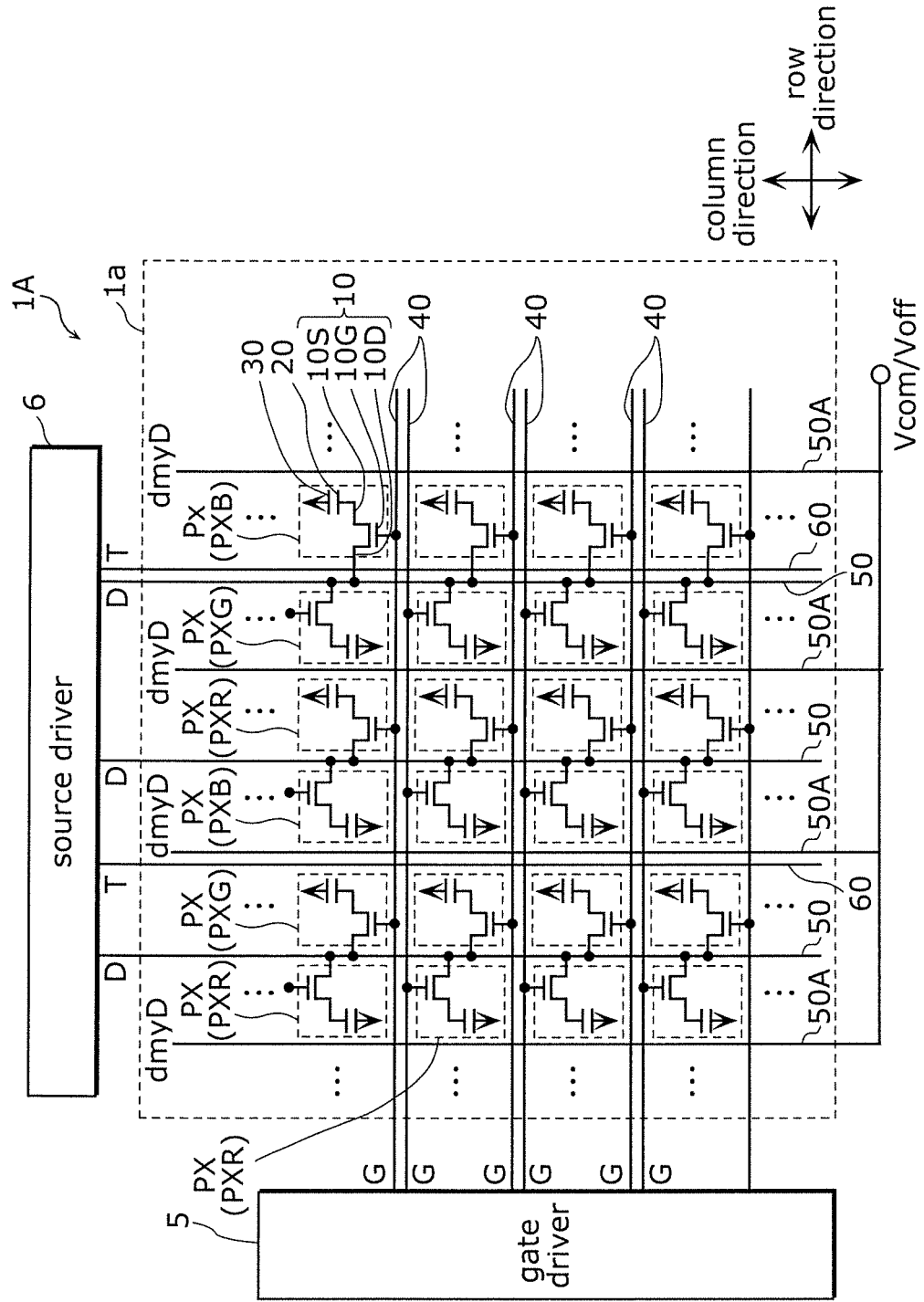
FIG. 11 is a diagram showing a pixel circuit of an in-cell touch panel used in an image display device according to a second exemplary embodiment.
Figure 12:
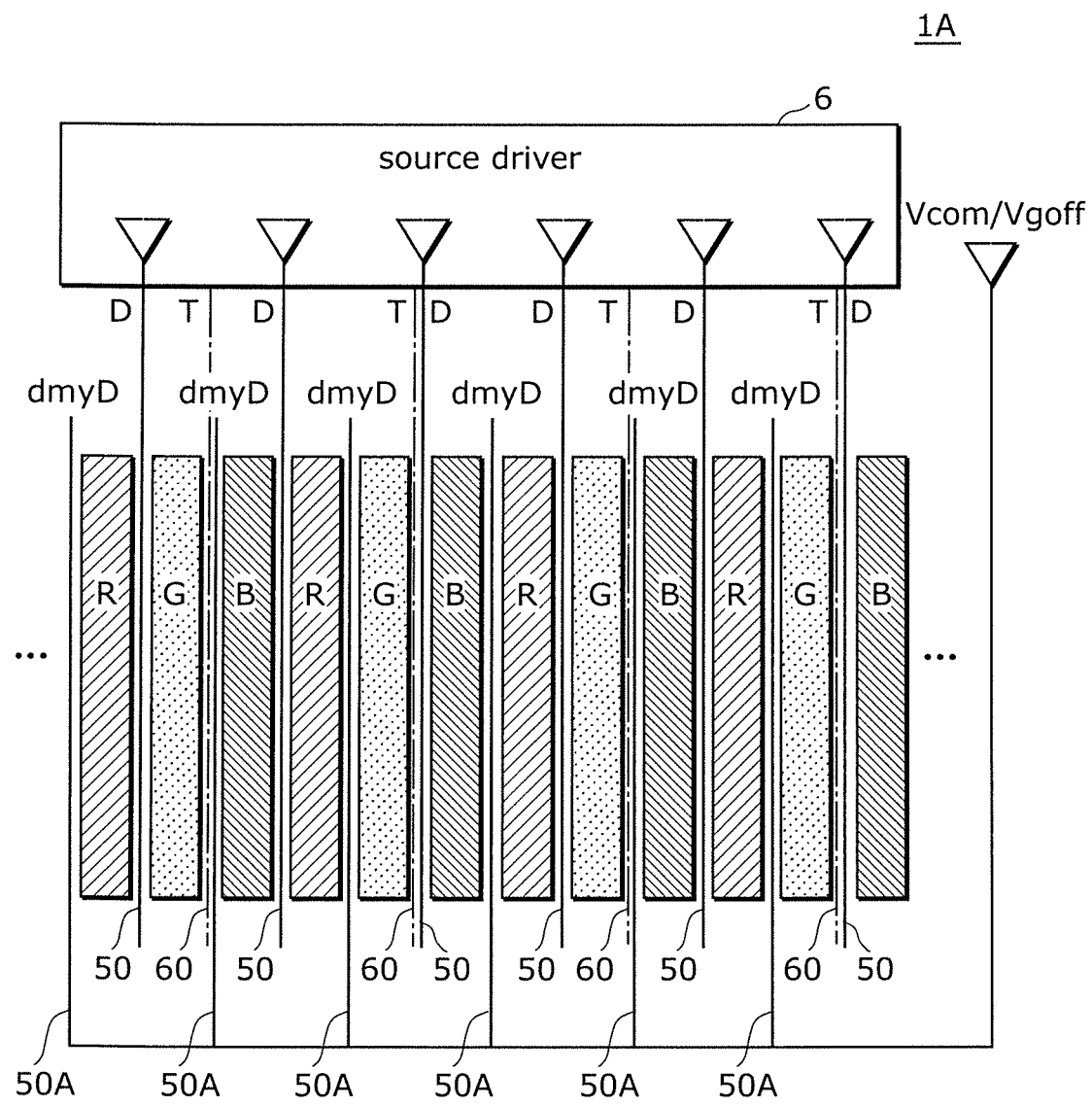
FIG. 12 is a diagram showing a relationship between a pixel array and wiring in the in-cell touch panel according to the second exemplary embodiment.

Next, a second exemplary embodiment will be described with reference to FIGS. 11 and 12. FIG. 11 is a diagram showing a pixel circuit of in-cell touch panel 1A used in an image display device according to the second exemplary embodiment. FIG. 12 is a diagram showing a relationship between a pixel array and wiring in in-cell touch panel 1A.

In FIG. 11, "G" denotes gate line 40, "D" denotes data line 50, "T" denotes touch line 60, and "dmyD" denotes dummy data line 50A. In FIG. 12, a solid line connected to source driver 6 indicates data line 50, a solid line not connected to source driver 6 is dummy data line 50A, and a one-dot chain line indicates touch line 60. In FIG. 12, regions denoted by "R", "G", and "B" indicate the pixel column of red pixel PXR, the pixel column of green pixel PXG, and the pixel column of blue pixel PXB, respectively.

The difference between in-cell touch panel 1A in the present exemplary embodiment and in-cell touch panel 1 in the first exemplary embodiment is the configuration of the pixel array and the relationship between the pixel array and the wiring.

Specifically, regarding the pixel array, in both in-cell touch panel 1A according to the present exemplary embodiment and in-cell touch panel 1 according to the first exemplary embodiment, three types of pixels including red pixel PXR, green pixel PXG, and blue pixel PXB, are cyclically and repeatedly arranged along the row direction. However, in in-cell touch panel 1 according to the first exemplary embodiment, the three types of pixels PX including red pixel PXR, green pixel PXG, and blue pixel PXB, are arranged in the cycle of RGBBRG, whereas in in-cell touch panel 1A according to the present exemplary embodiment, as shown in FIGS. 11 and 12, the three types of pixels PX including red pixel PXR, green pixel PXG, and blue pixel PXB, are arranged in the cycle of RGB.

That is, in in-cell touch panel 1A according to the present exemplary embodiment, like a general pixel array, three pixels of red pixel PXR, green pixel PXG, and blue pixel PXB are arranged as one set repeatedly along the row direction. Specifically, three pixel columns of a red pixel column where only a plurality of red pixels PXR are arranged, a green pixel column where only a plurality of green pixels PXG are arranged, and a blue pixel column where only a plurality of blue pixels PXB are arranged, are arranged as one set repeatedly along the row direction.

In in-cell touch panel 1A according to the present exemplary embodiment, while the general pixel array is employed, the wiring layout is devised in order to prevent geometric optical unevenness caused by the relationship between the pixel array and the wiring.

Specifically, in in-cell touch panel 1A according to the present exemplary embodiment, as wiring extending in the column direction, a plurality of dummy data lines 50A are provided in addition to data lines 50 and touch lines 60. Unlike data line 50, dummy data line 50A supplies no data signal to transistor 10 in each of the plurality of pixels PX. That is to say, dummy data line 50A are electrically isolated from transistors 10 in each pixels PX. Dummy data line 50A is provided in the same layer as data line 50. Therefore, data line 50 and dummy data line 50A are formed by patterning the same metal film. In the present exemplary embodiment, data line 50 and dummy data line 50A are formed in an SD layer.

Similarly to data line 50, the plurality of dummy data lines 50A are provided at the boundary between two pixels PX adjacent in the row direction. Specifically, each dummy data line 50A is provided between two pixel columns adjacent in the row direction in the image display region 1a. In the present exemplary embodiment, the plurality of dummy data lines 50A extend beyond the image display region 1a to a frame region 1b and are connected to each other in the frame region 1b.

Further, a voltage (fixed voltage) for making a fixed potential is applied to the plurality of dummy data lines 50A. Specifically, a DC voltage such as a common voltage (Vcom) or a gate-off voltage (Vgoff) is applied as a fixed voltage to the plurality of dummy data lines 50A.

Data lines 50 and dummy data lines 50A are alternately and repeatedly provided, and a corresponding either one of data lines 50 and dummy data lines 50A is provided for every boundary between two pixels PX adjacent in the row direction. Specifically, data lines 50 are provided for every two pixel columns adjacent in the row direction (every two columns), and dummy data lines 50A are provided for every two pixel columns adjacent in the row direction so as to be arranged alternately. For example, when data line 50 is provided in an odd-numbered column of pixel PX, dummy data line 50A is provided in an even-numbered column of pixel PX. On the contrary, when data line 50 is provided in the even-numbered row of pixel PX, dummy data line 50A is provided in the odd-numbered row of pixel PX.

In the present exemplary embodiment, touch line 60 is provided for every three pixels PX. That is, touch line 60 is provided for every three pixel columns. Specifically, touch lines 60 is provided only between green pixel PXG and blue pixel PXB.

Note that other configurations are basically the same as in-cell touch panel 1 in the first exemplary embodiment. For example, similarly to in-cell touch panel 1 in the first exemplary embodiment, in-cell touch panel 1A in the present exemplary embodiment also includes transistor 10, pixel electrode 20, common electrode 30, gate line 40, and the like. A dual-gate structure is used in the present exemplary embodiment as well. That is, two of the plurality of gate lines 40 are provided for each boundary between two pixels PX adjacent in the column direction.

As thus described, in-cell touch panel 1A in the present exemplary embodiment is configured to have such a relationship between the pixel array and wiring as shown in FIGS. 11 and 12. With this configuration, it is possible to prevent the generation of geometric optical unevenness. In particular, in the present exemplary embodiment, touch line 60 is provided only between green pixel PXG and blue pixel PXB (between GB), and touch line 60 is not provided between red pixel PXR and green pixel PXG (between RG) or between red pixel PXR and blue pixel PXB (between RB). As a result, color unevenness at the time of red single-color raster display can be effectively prevented, and countermeasures against lens unevenness can be achieved as compared with the first exemplary embodiment. Note that the lens unevenness refers to, for example, as described in JP-A-2017-167351, a phenomenon that, when light from the backlight reflected by touch line 60 is reflected again by another wiring such as data line 50 and is transmitted to the observer side, color unevenness is seen depending on the wavelength reflection characteristics of touch line 60. For example, when touch line 60 is mainly made of copper, touch line 60 reflects a lot of red component light, so that the light from the backlight reflected by touch line 60 is reflected again by another wiring such as a data line and is transmitted from the red pixel to the observer side, causing color unevenness.

As described above, according to in-cell touch panel 1A and the image display device in the present exemplary embodiment, even when touch line 60 and data line 50 extend in the same direction, it is possible to effectively prevent deterioration in image quality.

Moreover, the pixel array of in-cell touch panel 1 in the present exemplary embodiment is a general RGB array. Hence the second substrate (color filter substrate) can be manufactured at a low cost compared to in the first exemplary embodiment.

In the present exemplary embodiment, a predetermined voltage has been applied to the plurality of dummy data lines 50A, but the present invention is not limited to this. For example, a predetermined voltage may not be applied to the plurality of dummy data lines 50A. That is, the plurality of dummy data lines 50A may be floating lines.

Figure 13:
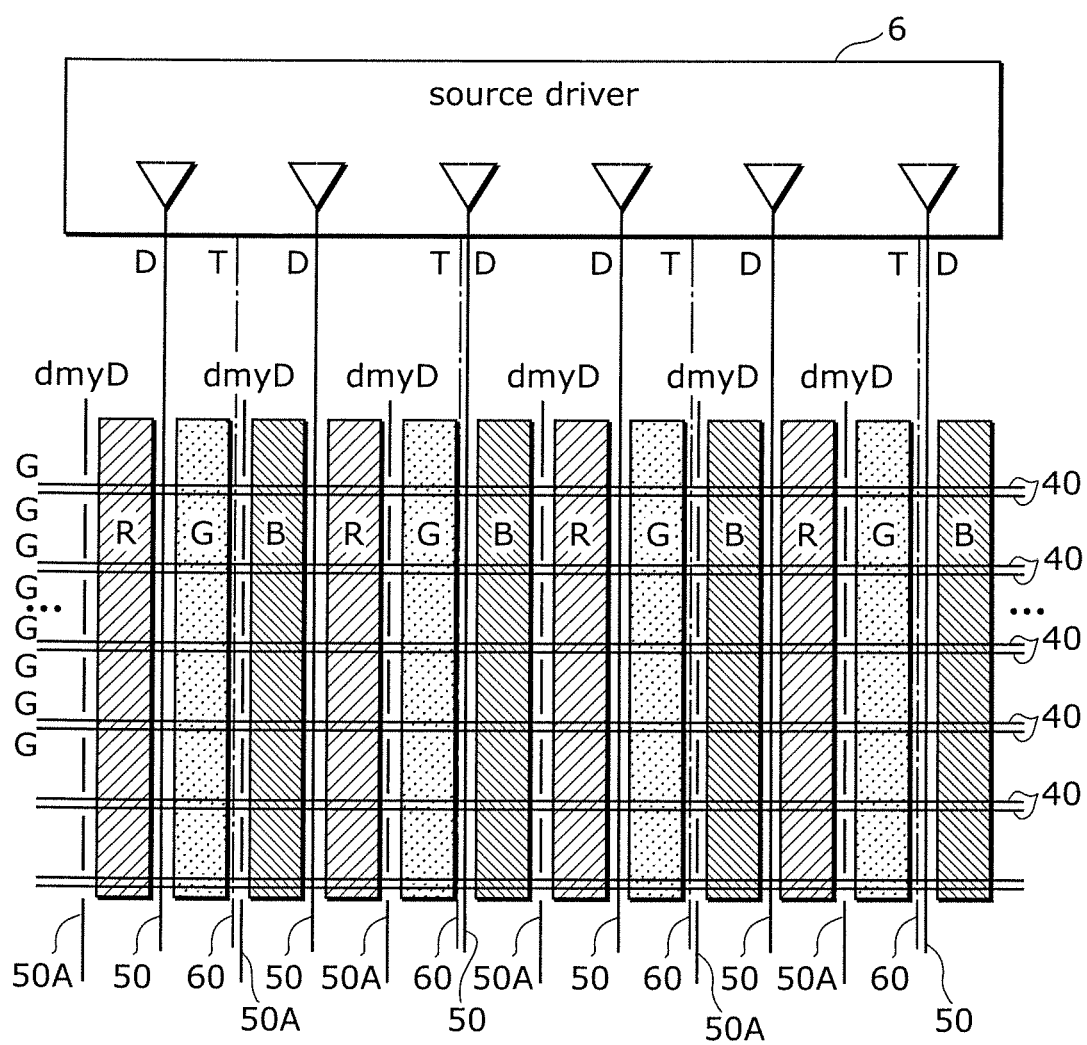
FIG. 13 is a diagram showing a relationship between a pixel array and wiring in an in-cell touch panel according to a modification of the second exemplary embodiment.

In this case, as shown in FIG. 13, each of the plurality of dummy data lines 50A is preferably divided at intersections with the plurality of gate lines 40. That is, each of the plurality of dummy data lines 50A is preferably formed in a broken line shape along the column direction and formed intermittently in the image display region 1a. Specifically, each dummy data line 50A divided into a plurality of pieces arranged in the column direction and space apart from each other, and each space between adjacent two pieces is on the gate lines 40. By dividing dummy data line 50A at the intersection with gate line 40 in this manner, a parasitic capacitance generated between dummy data line 50A and gate line 40 can be prevented, so that it is possible to prevent degradation in image quality that can be caused by providing floating dummy data line 50A so as to intersect gate line 40.

(Modification)

In the above, the in-cell touch panel, the image display device, and the like according to the present disclosure have been described on the basis of the first and second exemplary embodiments. However, the present disclosure is not limited to the first and second exemplary embodiments.

For example, in the first and second exemplary embodiments, the plurality of line electrodes 21 in pixel electrode 20 have been coupled by one coupling electrode 22, but the present invention is not limited to this. Specifically, both ends in the longitudinal direction of the plurality of line electrodes 21 may each be coupled by the coupling electrode 22.

In the first and second exemplary embodiments, data line 50 and drain electrode 10D of transistor 10 have been connected, and pixel electrode 20 and source electrode 10S of transistor 10 have been connected. However, the present invention is not limited to this. For example, data line 50 and source electrode 10S of transistor 10 may be connected, and pixel electrode 20 and drain electrode 10D of transistor 10 may be connected.

In the second exemplary embodiment, dummy data line 50A has been provided only between green pixel PXG and blue pixel PXB. However, the present invention is not limited to this. For example, dummy data line 50A may be provided between blue pixel PXB and red pixel PXR.

Further, dummy data line 50A extending in the column direction may be applied to the first exemplary embodiment. In the first and second exemplary embodiments, a dummy touch line formed in the same layer as touch line 60 may be provided. A predetermined voltage for making a fixed potential such as a gate-off voltage (Vgoff) or a common voltage (Vcom) may be applied to the dummy touch line, or the dummy touch line may be a floating line to which the predetermined voltage is not applied.

In the first and second exemplary embodiments, gate line 40 has extended in the row direction and data line 50 and touch line 60 have extended in the column direction. However, the present invention is not limited to this. Gate line 40 may extend in the column direction, and data line 50 and touch line 60 may extend in the row direction. That is, the first direction may be the column direction and the direction orthogonal to the first direction may be the row direction. In this case, the three types of pixels including red pixel PXR, green pixel PXG, and blue pixel PXB, may only be cyclically arranged in the column direction in a predetermined arrangement.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. An in-cell touch panel having an image display region made up of a plurality of pixels arranged in a first direction and a second direction intersecting the first direction, the in-cell touch panel comprising:
   transistors and pixel electrodes respectively provided in the plurality of pixels;
   common electrodes arranged in the first direction and the second direction, each faces one or more of the pixel electrodes and are provided separately from each other;
   gate lines extending along the first direction and supplying gate signals to the transistors respectively;
   data lines extending along the second direction and supplying data signals to the transistors respectively;
   dummy data lines extending along the second direction, provided in a same layer as the data lines, and electrically isolated from the transistors; and
   touch lines extending along the second direction and each connected to a corresponding one of the common electrodes, wherein
   either of the data lines and the dummy data lines are alternately provided for boundaries between two pixels among the plurality of pixels adjacent in the first direction, and
   the dummy data lines are connected to each other in a frame region surrounding the image display region.

2. The in-cell touch panel according to claim 1, wherein the touch lines are provided in a different layer from the data lines.

3. The in-cell touch panel according to claim 1, wherein the plurality of pixels are made up of a plurality of types of pixels arranged cyclically and repeatedly along the first direction, and
the touch lines are provided in accordance with a repetition of the plurality of types of pixels.

4. The in-cell touch panel according to claim 1, wherein the pixels are made up of three types of pixels including red pixels, green pixels, and blue pixels arranged cyclically and repeatedly along the first direction, and corresponding touch lines are provided for every three of the pixels.

5. The in-cell touch panel according to claim 4, wherein the touch lines are provided only for boundaries between the green pixels and the blue pixels.

6. The in-cell touch panel according to claim 1, wherein a fixed voltage is applied to the dummy data lines.

7. The in-cell touch panel according to claim 1, wherein no voltage is applied to the dummy data lines.

8. The in-cell touch panel according to claim 7, wherein each dummy data line includes a plurality of pieces arranged in the second direction and space apart from each other, and spaces between adjacent two pieces are on the gate lines.

9. The in-cell touch panel according to claim 8, wherein two gate lines are provided for a boundary between two pixels adjacent in the second direction.

10. An in-cell touch panel having an image display region made up of a plurality of pixels arranged in a first direction and a second direction intersecting the first direction, the in-cell touch panel comprising:
   transistors and pixel electrodes respectively provided in the plurality of pixels;
   common electrodes arranged in the first direction and the second direction, each faces one or more of the pixel electrodes and are provided separately from each other;
   gate lines extending along the first direction and supplying gate signals to the transistors respectively;
   data lines extending along the second direction and supplying data signals to the transistors respectively; and
   touch lines extending along the second direction and connected to a corresponding one of the common electrodes, wherein
      either of the data lines and the touch lines are alternately provided for boundaries between two pixels among the plurality of pixels adjacent in the first direction,
      the plurality of pixels are made up of three types of pixels including a red pixel, a green pixel, and a blue pixel, and
      six pixels of the red pixel, the green pixel, the blue pixel, the blue pixel, the red pixel, and the green pixel are arranged in this order as one set repeatedly along the first direction.

11. The in-cell touch panel according to any one of claim 1, wherein the data lines and the touch lines are connected to a source driver with a touch function.

* * * * *